United States Patent
Carlson et al.

(10) Patent No.: US 7,805,424 B2
(45) Date of Patent: Sep. 28, 2010

(54) QUERYING NESTED DOCUMENTS EMBEDDED IN COMPOUND XML DOCUMENTS

(75) Inventors: Jason D. Carlson, Redmond, WA (US); Christopher A. Hayes, Monroe, WA (US); Alexandre Mineev, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 11/403,336

(22) Filed: Apr. 12, 2006

(65) Prior Publication Data

US 2007/0244860 A1    Oct. 18, 2007

(51) Int. Cl.
*G06F 7/00* (2006.01)
*G06F 17/30* (2006.01)

(52) U.S. Cl. .................. 707/705; 707/736; 707/769; 707/774; 707/999.001

(58) Field of Classification Search .......... 707/E17.014
See application file for complete search history.

(56) References Cited

U.S. PATENT DOCUMENTS

| | | | | |
|---|---|---|---|---|
| 5,778,400 A | | 7/1998 | Tateno | ......................... 707/513 |
| 5,991,756 A | * | 11/1999 | Wu | ................................ 707/3 |
| 6,243,713 B1 | * | 6/2001 | Nelson et al. | ............. 707/104.1 |
| 6,654,734 B1 | | 11/2003 | Mani et al. | ....................... 707/2 |
| 6,708,164 B1 | * | 3/2004 | Cseri et al. | ....................... 707/4 |
| 6,782,380 B1 | | 8/2004 | Thede | ............................ 707/3 |
| 6,804,662 B1 | * | 10/2004 | Annau et al. | .................... 707/2 |
| 6,842,904 B1 | * | 1/2005 | Bartz et al. | ................. 719/328 |
| 6,904,562 B1 | * | 6/2005 | Hind et al. | ................... 715/239 |
| 6,963,869 B2 | * | 11/2005 | Burrows | ......................... 707/4 |
| 7,210,097 B1 | * | 4/2007 | Clarke et al. | ................. 715/227 |
| 7,213,017 B2 | * | 5/2007 | Rys et al. | ......................... 707/4 |
| 7,315,867 B2 | * | 1/2008 | Kobayashi et al. | ........... 707/102 |
| 7,403,940 B2 | * | 7/2008 | Narsude | ............................ 1/1 |
| 2003/0050959 A1 | * | 3/2003 | Faybishenko et al. | ........ 709/202 |
| 2003/0055818 A1 | * | 3/2003 | Faybishenko et al. | ........... 707/3 |
| 2003/0126120 A1 | * | 7/2003 | Faybishenko et al. | ........... 707/3 |
| 2004/0073541 A1 | | 4/2004 | Lindblad et al. | ................ 707/3 |
| 2004/0083209 A1 | | 4/2004 | Shin | .............................. 707/3 |
| 2004/0107402 A1 | * | 6/2004 | Seyrat et al. | ................. 715/513 |
| 2004/0199524 A1 | * | 10/2004 | Rys et al. | ..................... 707/100 |
| 2005/0004896 A1 | * | 1/2005 | Cseri et al. | ...................... 707/3 |
| 2005/0050011 A1 | * | 3/2005 | Van Der Linden et al. | ....... 707/3 |
| 2005/0091188 A1 | * | 4/2005 | Pal et al. | ......................... 707/1 |

(Continued)

OTHER PUBLICATIONS

Chamberlin, D., "XQuery: An XML Query Language", *IBM Systems Journal*, 2002, 41(4), 597-615, http://researchweb.watson.ibm.com/journal/sj/414/chamberlin.html.

(Continued)

*Primary Examiner*—Mohammad Ali
*Assistant Examiner*—Griselle Corbo
(74) *Attorney, Agent, or Firm*—Woodcock Washburn LLP (57) ABSTRACT

Querying a compound XML document having a primary XML document and multiple nested documents may be performed in a single query. The single query comprises an expression of at least one attribute and the encoding type of the nested documents. Execution of the query involves decoding each nested document according to its encoding type and searching for the attribute specified in the query. The results returned from each of the nested documents may be combined with the results returned from the primary document before returning the results to the user.

14 Claims, 4 Drawing Sheets

U.S. PATENT DOCUMENTS

| | | |
|---|---|---|
| 2005/0120031 A1* | 6/2005 | Ishii .......................... 707/100 |
| 2005/0131926 A1 | 6/2005 | Chakraborty et al. ....... 707/101 |
| 2005/0203957 A1 | 9/2005 | Wang et al. .............. 707/104.1 |
| 2005/0234856 A1* | 10/2005 | Baumhof ...................... 707/1 |
| 2006/0005122 A1 | 1/2006 | Lemoine ..................... 715/513 |
| 2006/0036593 A1* | 2/2006 | Dean et al. ..................... 707/4 |
| 2006/0036657 A1 | 2/2006 | Cheslow .................... 707/204 |
| 2006/0101100 A1* | 5/2006 | Konidena et al. ........... 707/204 |
| 2006/0112090 A1* | 5/2006 | Amer-Yahia et al. ........... 707/4 |
| 2006/0212800 A1* | 9/2006 | Kamiya ..................... 715/513 |
| 2007/0005581 A1* | 1/2007 | Arrouye et al. ................ 707/4 |
| 2007/0220023 A1* | 9/2007 | Dean et al. ................. 707/101 |

OTHER PUBLICATIONS

Fuhr, N. et al., "XIRQL: A Query Language for Information Retrieval in XML Documents", *SIGIR*, 2001, 172-180, http://delivery.acm.org.

Fuhr, N. et al., "XIRQL: An XML Query Language Based on Information Retrieval Concepts", *ACM Transactions on Information Systems*, 2004, 22(2), 313-356, http://delivery.acm.org.

Guo, L. et al., "XRANK: Ranked Keyword Search over XML Documents", *SIGMOND*, Jun. 2003, 12 pages, http://www.cs.cornell.edu.

* cited by examiner

Fig. 1 (Prior Art Method)

QUERYING NESTED DOCUMENTS EMBEDDED IN COMPOUND XML DOCUMENTS

BACKGROUND

The extensible Markup Language (XML) is a World Wide Web Consortium (W3C) endorsed standard for document and data representation that provides a generic syntax to mark up data with human-readable tags. XML does not have a fixed set of tags and thus allows users to define such tags as long as they conform to the XML standard. Data may be stored in XML documents as strings of text that are surrounded by text markup.

As XML's usage has grown, it has become generally accepted that XML is not only useful for describing new document formats for the Web but is also suitable for describing structured data. Examples of structured data include information which is typically contained in spreadsheets, program configuration files, and network protocols. XML is preferable to previous data formats because XML can easily represent both tabular data, such as relational data from a database or spreadsheet, and semi-structured data, such as a web page or business document. Therefore the XML language may be used to format any kind of data; not just textual data. Also, XML documents may have other XML documents embedded in them forming compound XML documents. Compound XML documents may have the embedded documents expressed as encoded documents which may contain many different types of data. The data in each of these embedded documents may be encoded differently. Examples of this include embedded documents that are encoded as HTML or Base64 encoded documents. Other encoding mechanisms are possible.

There are many languages that allow queries on XML documents such as XPath, XSLT, and XQuery. A navigation model of these languages allows reaching XML elements, such as tags, and their values within a target XML document by specifying a path consisting of XML names of tags or nodes in the target document. While this method proved to be very powerful on simple XML documents, there is a category of compound XML documents where the standard navigation model does not allow retrieving values from the nested encoded documents that are embedded into the primary XML document. Such compound XML documents usually occur when pieces of XML are stored as attribute values in the primary document or when the primary document represents a dataset retrieved from a database where some of the table columns contain XML documents that may be encoded.

Using standard XML query languages allows getting nested documents as a single large text string, but it does not allow querying their contents as a part of the same query. Querying the nested documents require generation of a second, third, or more queries depending on the level of nesting. It is desirable to query compound XML documents using fewer queries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect of the invention, a single query may be used to explore the contents of a compound XML document. The single query against the compound XML document comprises at least one attribute and the encoding used in the respective XML documents. An execution engine uses the encoding information to decode the respective nested documents and search for the attributes specified in the query. All results from the primary XML document and the encoded nested documents are combined. The total results may be presented to a user. In one aspect of the invention an unlimited number of levels of nesting may be accommodated in a single query. Thus, the invention eliminates the need for multiple queries or data manipulation steps against a compound XML document.

DETAILED DESCRIPTION

Exemplary Embodiments

Some XML query engines are supported by languages that only allow a query to search the primary document. When querying compound XML documents, this leads to the necessity that multiple queries are required if all nested documents within the compound XML document are to be searched for attributes or values of interest.

Figure 1:
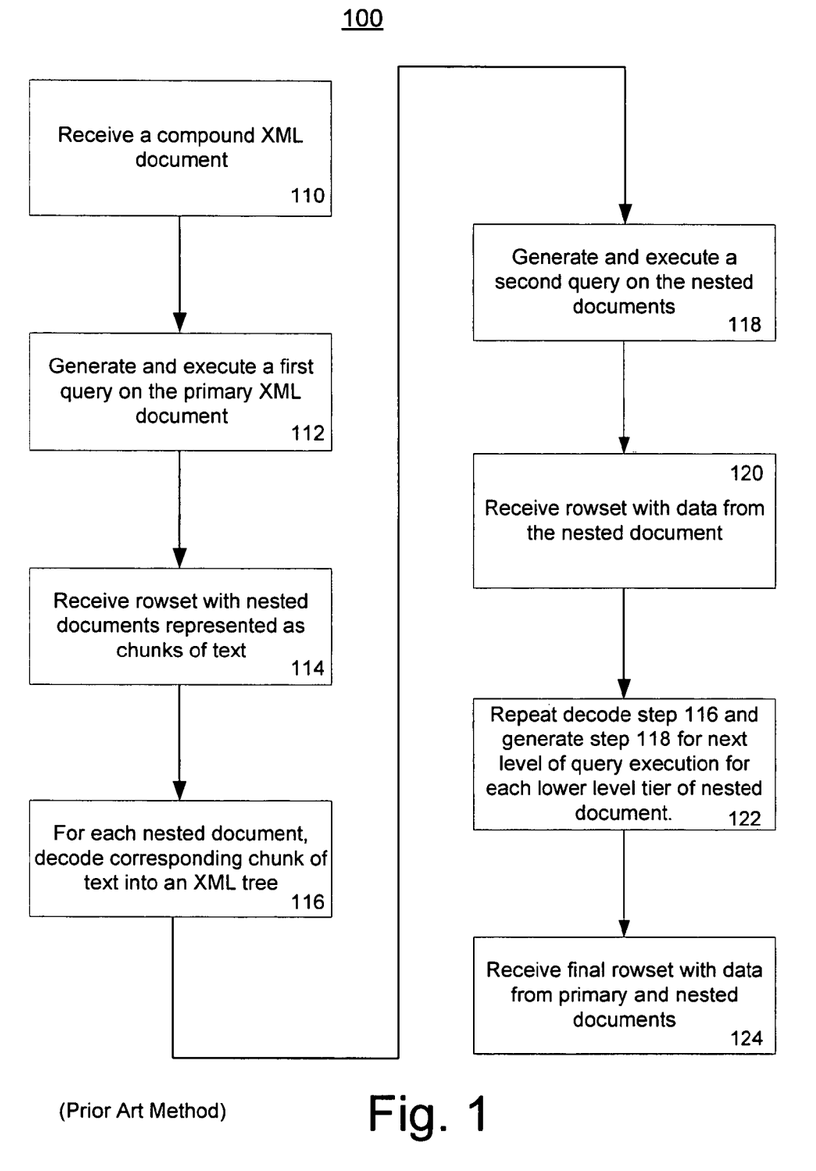
FIG. 1 is a flow diagram showing a prior art scheme of querying a compound XML document.

FIG. 1 represents a prior art method 100 that illustrates the basic technique of querying a compound document from a user perspective. The primary portion of a compound XML document contains data as an XML tree and also contains nested documents. Nested XML documents contain data as an encoded XML tree and potentially other nested documents. The number of levels of nesting is not restricted.

Initially, a compound XML document is received at step 110. The user generates and executes a first query on the primary XML document at step 112. An execution engine returns a rowset with the query data values. In a compound document, the nested documents are represented as chunks of data at step 114. The user determines the encoding information corresponding to the text chunk of data that represents a nested document. The user then decodes the corresponding chunk of text into an XML tree at step 116.

The user then generates a second query against the nested document and executes the second query at step 118. The returned rowset on the nested document is then received at step 120. Note that the returned rowset may indicate that another level of nested documents exists. If another nesting is present, the user must once again determine the encoding used on the lower tier nested document and decode the corresponding lower tier nested document into an XML tree. Another query for the lower tier nested document is then generated and executed at step 122. In the end, all received rowsets from the primary document, the first level nested document and the lower tier nested documents may be combined in order to produce a final rowset containing the returned query results. The final rowset, containing data from the primary and nested documents, may be received at step 124.

As can be noticed, the technique of FIG. 1 requires multiple iterations of query generation, determinations of encoding of nested documents, decoding of nested documents, and re-querying of nested documents. The present invention improves on this process via generation of a single query against the entire compound XML document including the nested documents.

An example primary XML document is provided below to help illustrate the process. The sample compound document has a main node called Dataset and two branch nodes called Row. Each Row has an attribute "id" and a nested document (<NestedDoc1>) in each row element. Each NestedDoc 1 has a nested document (<Nested Doc2>).

Sample primary XML document:

```
<DataSet>
    <Row id="r1"><NestedDoc1>
    &lt;NestedDoc2&gt;hello
&lt;/NestedDoc2&gt; </NestedDoc1>
        </Row>
    <Row id="r2"><NestedDoc1>
    &lt;NestedDoc2&gt;hello2
&lt;/NestedDoc2&gt; </NestedDoc1>
        </Row>
</DataSet>
```

If the compound XML document is queried for the row and row contents using a standard query, the return results will include a text string indicative of a nested and encoded document. For example, an ElementPath statement may be used in the standard query. ElementPath is an element of the Report Server XML Data Provider™ of SQL Server™ 2005 available from Microsoft® Corporation of Redmond, Wash. The ElementPath element in the Report Server XML Data Provider™ query language defines the sequence of nodes to traverse within the XML document to retrieve fields of data. A query using the standard ElementPath statement allows querying the contents of <Row> element as a text value. For example:

```
<Query>
    <ElementPath>
        DataSet/Row{@id, @}
    </ElementPath>
</Query>
```

This query will return the attributes and the corresponding values for each <Row> element using two columns: one column with the value of the id attribute of the <Row> element and another column with the <Row> element's text value. Note that the query returns the contents as encoded XML documents.

| Row_id | Row_value |
|---|---|
| r1 | <NestedDoc1> &lt;NestedDoc2&gt;hello &lt;/NestedDoc2&gt; </NestedDoc1> |
| r2 | <NestedDoc1> &lt;NestedDoc2&gt;hello2 &lt;/NestedDoc2&gt; </NestedDoc1> |

Note that the standard ElementPath statement in the Report Server XML Data Provider™ query language on a compound XML document returns text in the row column indicative of a nested document and not any value sought from that nested document. The present invention allows the enhancement of the ElementPath statement to retrieve values directly from the nested documents of the compound XML document when querying against the primary XML document itself.

The new ElementPath statement allows retrieving values from both NestedDoc1 and NestedDoc2 by defining that some elements contain encoded XML. For example, encoded XML can take the form of HTML encoding or BASE64 encoding. Thus, a useful extension to the ElementPath definition is possible to permit a single query to search the primary XML document and the nested documents within it. For example, an extended ElementPath statement may be used in the query such that the new single query is:

```
<Query>
    <ElementPath>
        DataSet/Row(HTMLEncoded){@id}/NestedDoc1(HTMLEncoded)/NestedDoc2{@}
    </ElementPath>
</Query>
```

In this new single query against the primary XML document, the value of Row element has an HTMLEncoded nested document with a root element "NestedDoc1". This allows the execution engine to decode it and navigate inside of it. Here also, inside the contents of NestedDoc1 is another HTMLEncoded nested document with a root element "NestedDoc2". The ElementPath syntax that describes the encoding allows the execution engine to decode NestedDoc2 and navigate inside it. Finally, this exposes the desired value within NestedDoc2. The results of the single query against the compound XML document are as follows:

| Row_id | NestedDoc2_value |
|---|---|
| r1 | hello |
| r2 | hello2 |

In the above example, only the Row and the value of NestedDoc2 were specifically requested. However, rows of information containing values from the primary XML document, the first level of nested document, and any other level of nested document are able to be queried and returned in the single query statement. Naturally, the encoding used on any of the nested documents may vary from one nested document to another.

Figure 2:
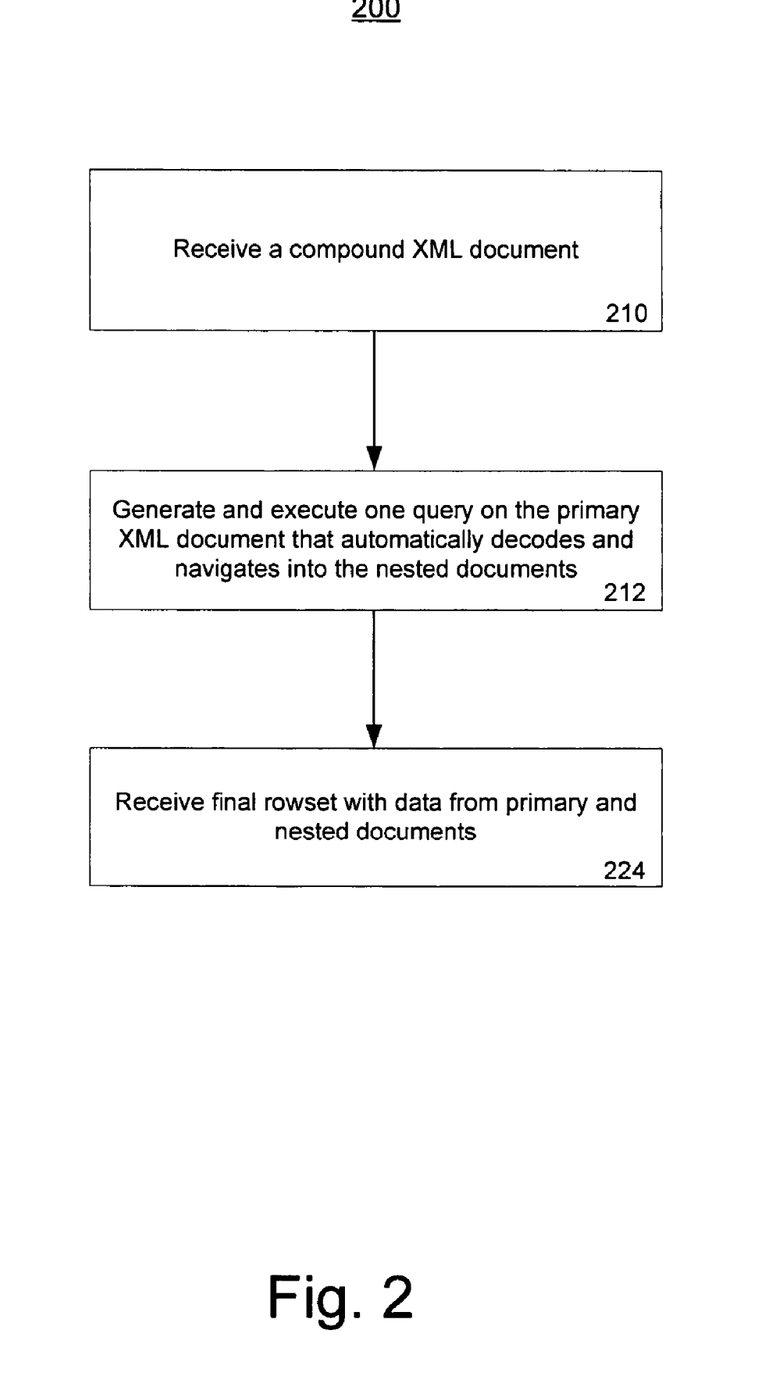
FIG. 2 is an example flow diagram demonstrating aspects of the invention from a user perspective.

FIG. 2 depicts a method of querying a compound XML document from a user's perspective using aspects of the present invention. Initially, a user receives a compound XML document at step 210. Then the user may examine the document and generate and execute a single query that will automatically decode all of the desired nested documents, at all desired levels at step 212. Results from the single query will incorporate results from all queried levels of the compound XML document including the primary XML document, the first level of nested documents, and all desired lower tier nested documents, and is received as a final rowset at step 224. Note that this procedure provides results from multiple levels of nested documents within a compound XML document without generating more than one query and without the separate sets of results from multiple queries as required in the prior art method of FIG. 1. Thus, there is an advantage of simplicity of use by employing the single query of the present invention.

Figure 3:
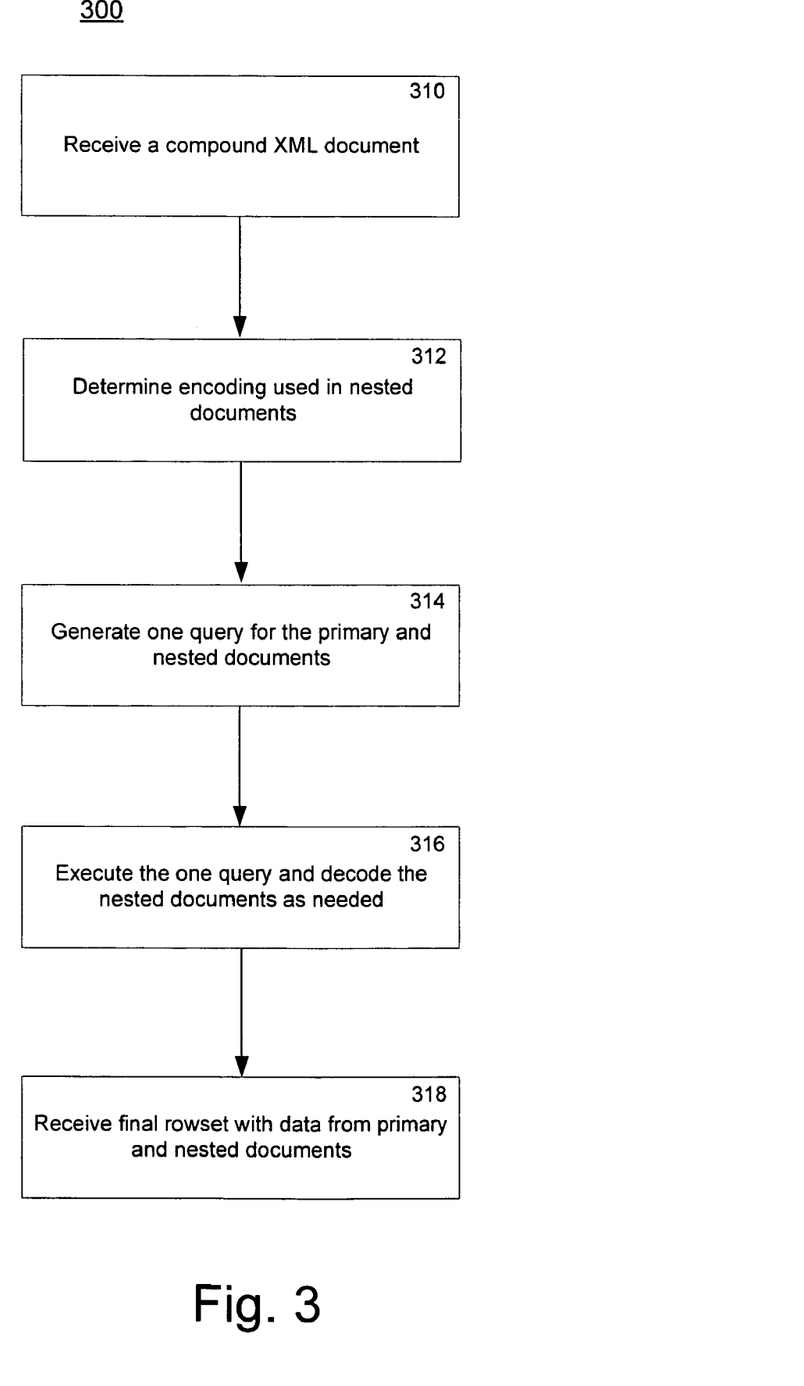
FIG. 3 is an example flow diagram showing one method of the invention.

FIG. 3 depicts a flow diagram of a method which incorporates aspects of the current invention. A compound XML document may be received at step 310. Here, a compound XML document is an XML document that has nested documents. The nested documents may be nested in a multiple fashion where one nested document leads to another nested document and so forth. The encoding types of the nested documents within the primary XML document are determined at step 312. The determination of the encoding used for the nested documents of interest is preferably performed before construction of a query against the compound XML document. Encoding schemes commonly used today include HTML and Base 64. Any suitable encoding method known to those of skill in the art may be used. The encoding is used to envelope the nested document so that it may be separately discernible from the primary XML document. The encoding technique used may be determined by automatic or manual inspection of the compound XML document as well known by those of skill in the art. Generally, foreknowledge of the structure of the primary document (and nested documents) is required to determine the encoding types. However, automatic detection may be performed either via lexicographic analysis of the contents of the encoded document or via attempting to decode the encoded document using known codecs.

In one embodiment, the encoding schemes for the various nested documents may be provided by the compound XML document provider. In the case of multiple nesting of documents, a document tree or node structure may be provided to assist in mapping the various encoded nested documents and their relationship to the root primary document.

After the encoding of the nested documents of interest is known, then a single query can be generated to search all desired portions of the compound XML document in step 314. The single generated query can search any aspect of the compound XML document including the primary XML document and the various nested documents. The query can be generated manually or the query may be generated automatically or semi-automatically. In one embodiment, a graphical user interface may be used to enable a user to identify what query items in which nested documents are of interest in a search of the compound XML document. In this instance, a fully coded query may be generated based on a user input via graphical user interface that displays the implied tree node structure of the primary XML document and the nested document structure.

In one embodiment, the query may take the form of an expanded ElementPath statement in a Report Server XML Data Provider™ in SQL Server™ 2005. The basic syntax of the query in a nested document includes:

Node(encoding_of_nestedDoc1){searchterm}/nestedDoc1_root where:

Node is an element of the tree of the XML document.

Encoding of nestedDoc1 is the encoding used to wrap a nested document called nestedDoc1.

Searchterm is a query search term.

NestedDoc1_root is the name of the root node of the nested XML document.

In one aspect of the invention, the above syntax may be concatenated so that lower levels or tiers of nested documents may be queried in a single query statement. For example, consider the statement;

Node1 (encoding_of_nesteddoc1){searchterm1}/nesteddoc1_root/subNode1/subNode2 (encoding_of_nesteddoc2){searchterm2}/nesteddoc2_root.

This statement searches node 1, having encoding on nested document 1, for an attribute or search term 1 in document nested doc1. Then, the search continues to a lower level nested node 2, having encoding on nested document 2, for an attribute or search term 2 in document nested doc2. Thus, one may generate a single query by concatenation of the various queries for each nested portion of interest of the compound XML document.

In one aspect of the invention, the structure of the compound XML document is implied in the construction of the query statement such that the first portion of the statement, if present, suggests the attribute to be sought in the primary XML document. The second portion of the statement, if present, suggests the attribute and encoding of the first level of nested documents. The third portion of the statement, if present, suggest the attribute and encoding of the next level down nested document. The fourth portion of syntax, if present would be constructed to decode and access the next lower tier of nest documents, etc. In addition to handling arbitrarily deep nesting, the syntax can also be generalized to cover multiple nested items and peer encoded documents at any level. For example, consider the following XML document:

```
<DataSet>
    <Row id="r1">
        <DocA><NestedDoc1>Data1A</NestedDoc1></Doc1>
        <DocB><NestedDoc2>Data1B</NestedDoc2></Doc2>
    </Row>
    <Row id="r1">
        <DocA><NestedDoc1>Data2A</NestedDoc1></Doc1>
        <DocB><NestedDoc2>Data2B</NestedDoc2></Doc2>
    </Row>
</DataSet>
```

A query could be issued against this document such as:

```
<Query>
    <ElementPath>
        DataSet/Row{@id, DocA(HTMLEncoded)/NestedDoc1{@},
    DocB(HTMLEncoded)/NestedDoc2{@}}
    </ElementPath>
</Query>
```

Returning to FIG. 3, after the single query is generated, the query may be executed at step 316. The execution includes decoding the nested documents as needed. For example, in a variation of the example given above, the query included the statement; DataSet/Row(HTMLEncoded){@id}/NestedDoc1(BASE64Encoded)/NestedDoc2{@}.

In this statement, NestedDoc1 is HTML encoded and NestedDoc2 is BASE64 encoded. Execution of this statement includes decoding the HTML encoded Nested Doc1 and retrieving the value of id. Also, execution includes decoding the BASE64 encoded Nested Doc2 and retrieving the value of that document. The execution may be performed in a execution environment that includes a processor in a query execution engine. The query execution engine may access program code stored in memory, that contains instructions for interpreting the single query statement, instructions for performing the decoding of the nested documents, and instructions for the assembly of the individual rowset portions from each nested document into a composite or combined query result.

As mentioned above, the single query can be used to search multiple documents starting with the principal XML document and ending with the last nested document specified by the query. Thus, a plurality of retrieved data sets may be produced. Each one of these retrieved data sets or rowsets is combined in step 318 to produce a combined or composite rowset. This final combined rowset includes all of the retrieved rows from the principal XML document and each of the nested documents that were queried. The XML primary document and encoded nested documents may each produce a retrieved rowset using a single query and producing a single composite result set. The results may assembled in a storage device or an accumulator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 4:
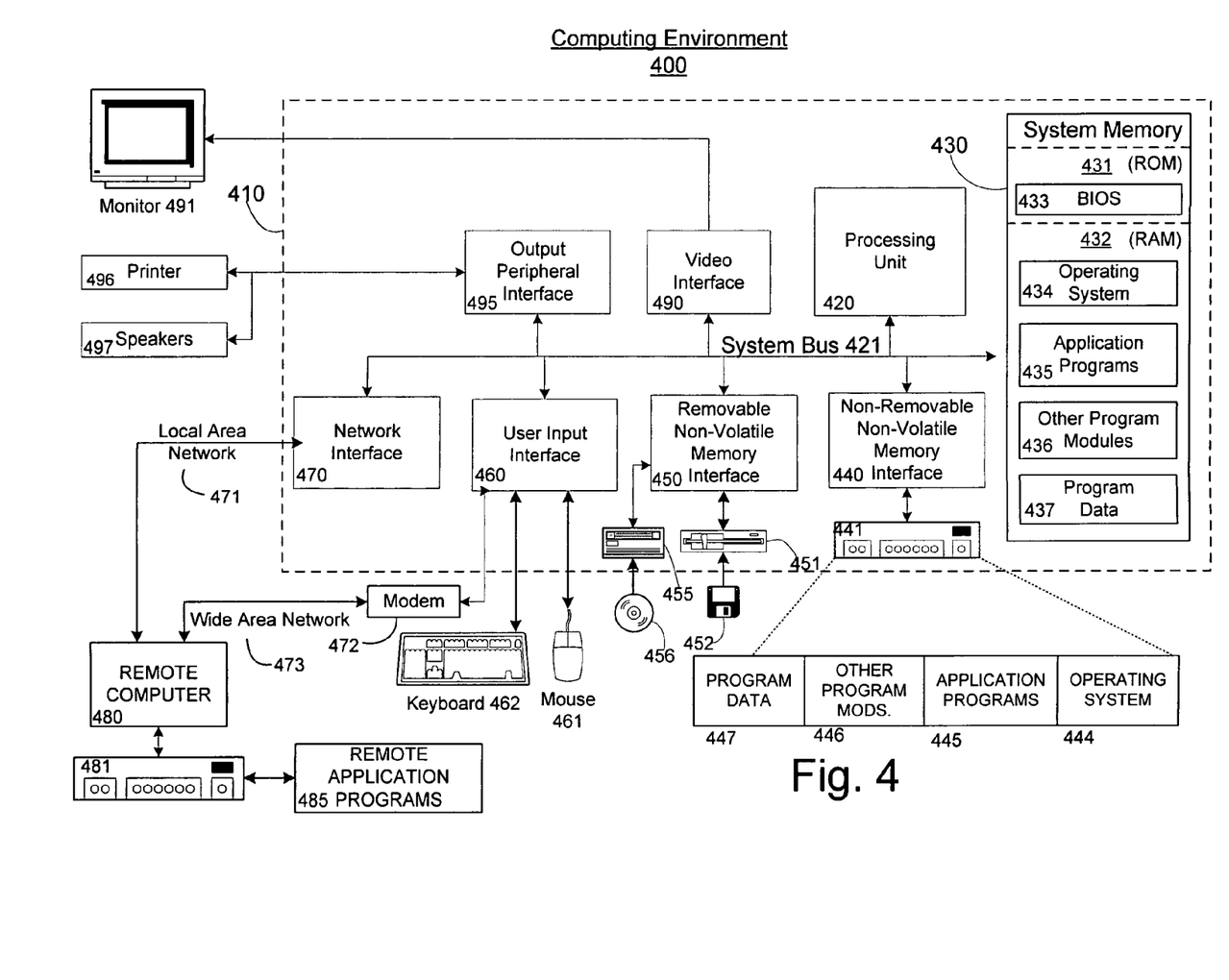
FIG. 4 is a block diagram showing an example host computing environment.

FIG. 4 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system embodied as a computing environment 400 for implementing an example host computer includes a general purpose computing device in the form of a computer system 410. Components of computer system 410 may include, but are not limited to, a processing unit 420, a system memory 430, and a system bus 421 that couples various system components including the system memory 430 to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for querying compound XML documents using a single query. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method to query a compound XML document, the method comprising:

receiving a compound XML document comprising a primary document, a first nested document, and a second nested document that is nested within the first nested document;

determining a first encoding type associated with the first nested document and a second encoding type associated with the second nested document;

generating a single query against the compound XML document, the query comprising an attribute and a first query element specifying the first encoding type, a first search term, and a first root node of the first nested document, the query further comprising a second query element specifying the second encoding type, a second search term, and a second root node of the second nested document;

executing the query and decoding the first nested document and the second nested document; and receiving a first rowset from the first nested document and a second rowset from the second nested document, wherein executing the query comprises decoding the first nested document associated with the first encoding type to reveal contents of the first nested document and decoding the second nested document associated with the second encoding type to reveal contents of the second nested document and querying the contents of both revealed documents.

2. The method of claim 1, wherein receiving a compound XML document comprises receiving an XML document with multiple levels of nested documents.

3. The method of claim 1, wherein determining an encoding type associated with the first nested document comprises determining whether the first nested document is encoded as an HTML-encoded document or as a Base64-encoded document.

4. The method of claim 1, wherein generating a single query against the compound document further comprises generating a single query that requests a value of one or more attributes found in both the primary XML document and the first nested document.

5. The method of claim 4, further comprising:
collecting rowsets from the primary document and the first nested document and producing a composite rowset.

6. The method of claim 5, wherein the single query against the compound document further comprises a query against a plurality of nested documents having a peer encoded document at one or more nested levels.

7. A computer system to query a compound XML document, the computer system comprising:
a processing unit to execute a program to query the compound XML document;
a data storage device comprising a program to interpret a single query statement against the compound XML document; and
a user interface to input elements of the single query statement and present return results;
wherein the compound XML document comprises a primary XML document and a first encoded nested document and a second encoded nested document, wherein the elements of the single query statement comprise at least one respective attribute, respective encoding information, a respective search term, and a respective root node for each of the first and second encoded nested documents, wherein the processing unit acts to execute the single query statement and decode the first encoded nested document and the second encoded nested document such that the at least one attribute is returned from both the first encoded nested document and the second encoded nested document, and wherein the elements of the single query statement are concatenated together to form the single query statement
wherein the processing unit acts to execute the single query statement such that the at least one attribute is returned from both the first nested document and second nested document by using the encoding information to decode the first and second nested documents in order to expose contents of each before assessing the at least one attribute.

8. The computer system of claim 7, further comprising:
a storage device which accumulates results from the first encoded nested document and the second encoded nested document and combines the results into a composite query return from the compound XML document.

9. The computer system of claim 7, wherein the encoding of the first encoded nested document and the second encoded nested document is at least one of HTML and Base64.

10. The computer system of claim 7, wherein the single query further comprises at least one attribute from the primary XML document and wherein results from the primary XML document are returned with results from the first and second encoded nested documents.

11. The computer system of claim 7, wherein the second encoded nested document is contained within the first encoded nested document.

12. A computer-readable storage medium having computer-executable instructions for performing a method of querying against a compound XML document, the method comprising:
receiving a compound XML document comprising a primary document, a first nested document, and a second nested document that is nested within the first nested document;
determining a first encoding type associated with the first nested document and a second encoding type associated with the second nested document;
generating a single query against the compound XML document, the query comprising an attribute and a first query element specifying the first encoding type, a first search term, and a first root node of the first nested document, the query further comprising a second query element specifying the second encoding type, a second search term, and a second root node of the second nested document
executing the query and decoding the first nested document and the second nested document;
receiving a first rowset from the first nested document and a second rowset from the second nested document; and
providing composite results of the first nested document and the second nested document,
wherein the step of executing the query comprises decoding the first nested document associated with the first encoding type to reveal contents of the first nested document and decoding the second nested document associated with the second encoding type to reveal contents of the second nested document and querying the contents of both revealed documents.

13. The computer-readable storage medium of claim 12, wherein the step of determining an encoding type used in the nested document comprises determining whether each of the first nested document and the second nested document is encoded as an HTML-encoded document or as a Base64-encoded document.

14. The computer-readable storage medium of claim 12, wherein the step of generating a single query against the compound document further comprises generating a single query that requests a value of the attribute found in both the primary XML document and the first nested document.

* * * * *